United States Patent [19]

McCue

[11] 4,438,170

[45] Mar. 20, 1984

[54] ELECTROSENSITIVE RECORDING MATERIALS WITH HETEROGENEOUS SURFACE TOPOLOGY

[75] Inventor: John P. McCue, Holyoke, Mass.

[73] Assignee: Philip Morris Industrial Incorporated, New York, N.Y.

[21] Appl. No.: 390,610

[22] Filed: Jun. 21, 1982

[51] Int. Cl.$^3$ ........................ B44D 1/16; G01D 15/08

[52] U.S. Cl. .................................... 428/207; 428/209; 428/211; 428/457; 428/537.5; 346/135.1; 346/162; 346/163; 346/164; 101/DIG. 15

[58] Field of Search ............... 428/207, 209, 211, 457, 428/537; 101/DIG. 15; 346/135.1, 162, 163, 164

[56] References Cited

U.S. PATENT DOCUMENTS

| | | | |
|---|---|---|---|
| 3,786,518 | 1/1974 | Atherton | 428/331 |
| 3,861,952 | 1/1975 | Tokumoto | 428/207 |
| 4,279,961 | 7/1981 | Fujioka et al. | 428/207 |

*Primary Examiner*—John E. Kittle
*Assistant Examiner*—John L. Goodrow
*Attorney, Agent, or Firm*—Quarles & Brady

[57] ABSTRACT

Electrosensitive recording materials (15) made with a substrate (16) of paper or plastic film; an intermediate layer (17) including a film-forming organic binder, small-sized solid particulates and large-sized solid particulates; and a thin even layer of metal (18) vacuum-deposited over the intermediate layer.

6 Claims, 7 Drawing Figures

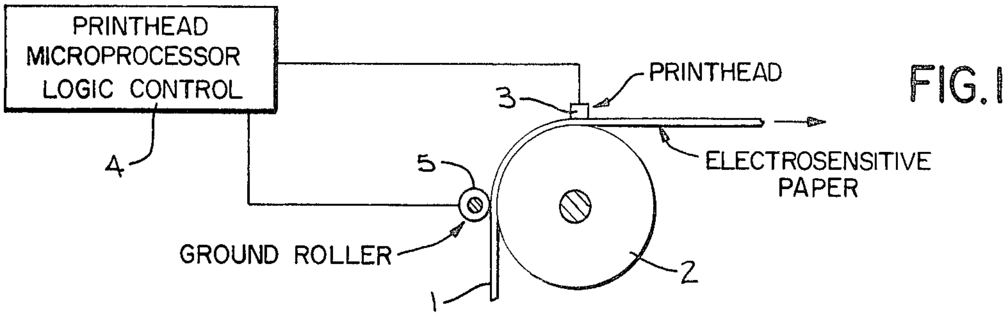
FIG.1
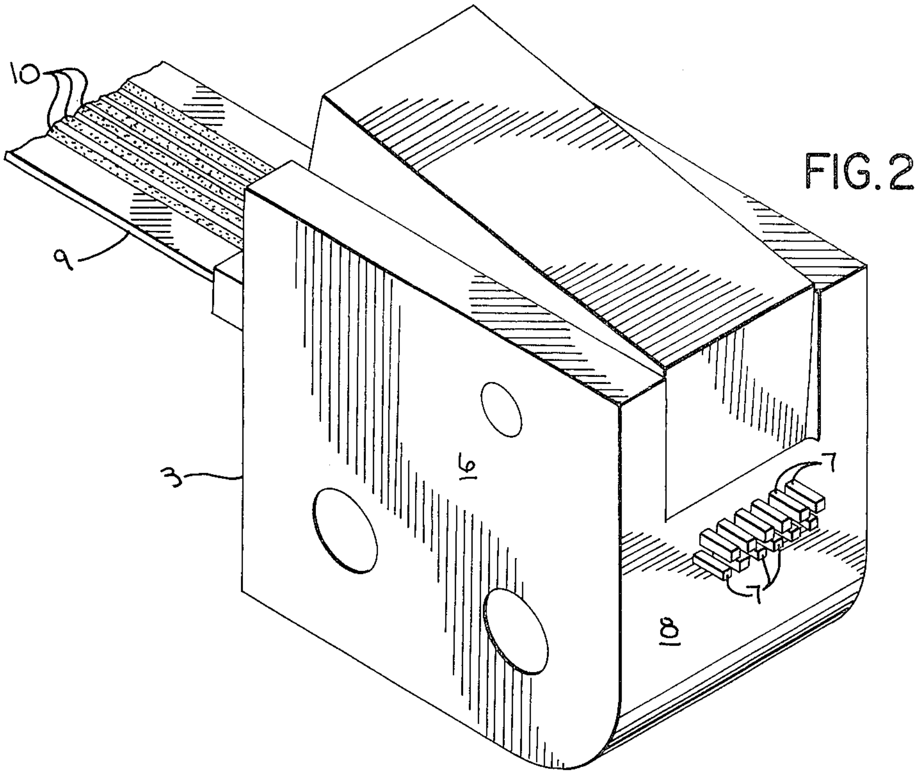
FIG.2
FIG.3
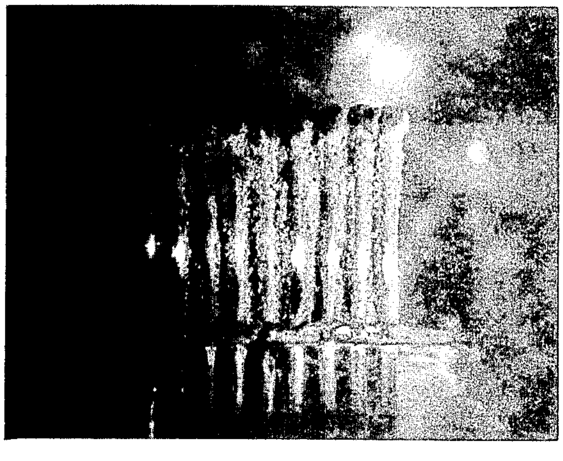

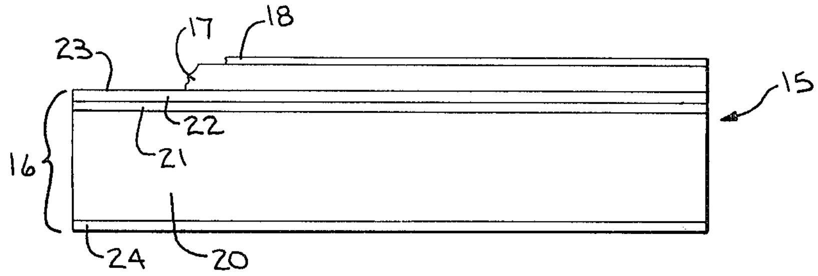
FIG. 4
FIG. 5
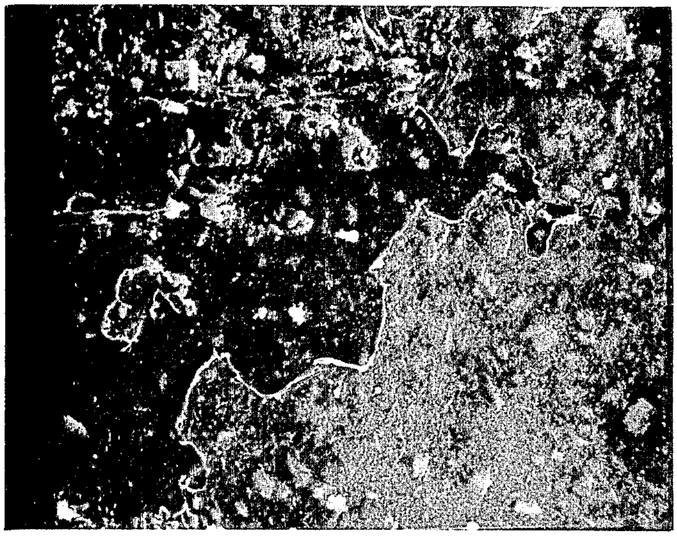
1000X

100X

1000X shows the adverse effect of thermal instability of the intermediate layer of the paper;

FIG. 6 is a SEM photomicrograph at 100× of a paper according to this invention; and FIG. 7 is a SEM photomicrograph at 1000× of the paper of FIG. 6.

DESCRIPTION OF PREFERRED EMBODIMENTS

(a) Background Description, FIGS. 1–3

FIG. 1 is a schematic representation of one form of printing apparatus for which the electrosensitive paper of this invention was developed. A web of electrosensitive paper 1 is transported about a roller 2 and a printhead 3 contacts the metallized upper surface of the paper. The printhead has an array of tightly packed electrodes that bear against the paper. Transmission of electric current, which is generally DC current (either plus or minus) in the range of about 4 to 200 volts, to the wires is controlled by a printhead microprocessor logic control 4 which directs current to selected electrodes in the printhead array so as to develop the desired image; AC current in the range of about 4 to 400 volts may be used by some printers. A ground roller 5 contacts the metallized surface of the paper in order to complete the electrical circuit. When the electric current reaches the paper, a small portion of the metal layer contacted by an energized electrode is vaporized to thereby expose a colored coating underneath the metal layer. Alphanumeric and graphic images can thus be formed on the surface of the paper. The size of a printed dot formed with a printhead is a function of voltage amplitude and duration, and excellent control can be maintained over the quality and resolution of the printed image. The printhead is driven across the paper by a suitable driving mechanism, and may be programmed to print individual characters serially or print a complete line at a time. High speed printing such as in the range of 250 to 2,200 characters/minute is possible, and the printhead may print in one or both directions as it is driven across the paper.

A typical printhead 3 is shown in greater detail in FIG. 2. The printhead includes a body 6 of plastic in which a plurality of electrodes 7 are embedded, the electrodes extending from a surface 8 of the body. An array of twelve electrodes arranged in two rows of six each is illustrated in the exemplary embodiment, but other arrangements may be used. A flexible tail 9 extends from the body and may comprise two or more layers of plastic film that encase a plurality of electrical leads 10, there being one lead 10 connected to each electrode 7 of the printhead; in the illustrated embodiment, the leads 10 are in two rows of six each arranged with one row on top of the other, so that only six leads are visible in FIG. 2. The leads will extend to the end of the tail, not shown, for connection to the circuitry of the microprocessor.

High resolution printing requires the use of a closely packed array of electrodes 7, which are often of very small size such as 15 microns square, to print images with a number of dots that are very close together. However, debris from the paper is generated during printing due to the mechanical action of the printhead 3 moving back and forth across the paper and due to the thermal action of the metal layer of the paper being vaporized when subjected to relatively high energy electrical arcs during printing.

FIG. 3 is an optical photomicrograph at 20× of a printhead similar to that illustrated in FIG. 2. The accumulation of fine particles of debris, consisting mostly of particles of metal from the metallized layer of the paper and particles of the coating underneath the metallized layer, between the electrodes of the printhead is clearly visible in FIG. 3. The build-up of the debris can reach a level sufficient to impair the quality of the printed image. The printhead will then have to be replaced or cleaned, resulting in temporary shut-down of the printing apparatus.

Another problem associated with high resolution graphics printing with some types of printing apparatus is that numerous multiple firings of the printhead electrodes in a short time interval can cause substantial thermal stress of the electrosensitive paper. This imposes an additional requirement of increased thermal stability of the electrosensitive paper so that thermally-induced changes of coatings on the paper will not interfere with quality printing.

(b) Description of Electrosensitive Papers FIGS. 4–9

FIG. 4 is a diagrammatic representation of an electrosensitive paper 15 of the present invention. The paper 15 includes a substrate 16, an intermediate layer 17 applied over one surface of the substrate, and a vacuum deposited metal layer 18 applied over the layer 17. The objectives of this invention are met by producing the electrosensitive paper 15 with a substrate 16 having specified surface smoothness and absorption characteristics, and controlling the surface architecture of the paper by means of the particulates incorporated in the intermediate layer 17. Each of these elements of the paper is discussed in detail in the following sections (1)–(3).

(1) Substrate

The substrate 16 comprises a web of paper 20 which may have one or two coatings on one of its surfaces, coatings 21 and 22 being shown in the exemplary embodiment of FIG. 4, in order to develop a surface 23 on which the intermediate layer 17 is applied that has defined surface roughness and coating penetration characteristics. As mentioned above, the papers of this invention utilize a substrate 16 with a very smooth surface 23 having the characteristics hereinafter disclosed, and the heterogeneous topology of the finished paper is controlled by the nature of the intermediate layer 17.

Because papers are fibrous in nature, they generally have an uneven surface which is not subject to close control. Papers will therefore have surface irregularities and exhibit nonuniform absorption of applied coatings, and both of these features have a deleterious effect on the print quality of an electrosensitive paper. In order to minimize the surface roughness of paper, the paper 20 is preferably a calendered paper so as to have a relatively smooth surface. Furthermore, however, a first coating 21 may be applied over a surface of the paper, and with some papers a second coating 22 may be applied over the first coating, in order to further smoothen the surface irregularities of the paper and control the penetration of the subsequently applied intermediate layer 17 into the substrate. With some papers, depending upon their smoothness and absorbency characteristics, only one or neither of the coatings 21 or 22 may be required in order to impart the desired properties to the surface 23 of the substrate to which the intermediate layer is to be applied. The coatings 21 and/or 22 are conventional

ELECTROSENSITIVE RECORDING MATERIALS WITH HETEROGENEOUS SURFACE TOPOLOGY

TECHNICAL FIELD

This invention relates to electrosensitive recording materials suitable for developing alphanumeric and graphic images upon being subjected to a printhead or stylus energized with electric current.

BACKGROUND ART

Electrosensitive printing is a well-known form of nonimpact printing technology. A sheet or web of paper having a metallized surface, generally a thin layer of aluminum, is subjected to electric current from a printing element having one or more electrodes that lightly contact the paper. The electrodes may be wires or a metal element such as of tungsten etched to define individual electrodes. Within an extremely short time, depending upon the voltage applied to the printing element and the manner in which it is applied, the metal layer is vaporized in controlled patterns to expose an underlying dark layer and thereby form the desired images.

Electrosensitive printing offers advantages of mechanical simplicity, quiet high speed operation and low equipment and maintenance costs as compared to impact printing and other forms of nonimpact printing. For example, electrostatic nonimpact printers are considerably more expensive than electrosensitive printers, and thermal nonimpact printers are substantially slower than electrosensitive printers because of the time required to form the images. The technology originally was employed with chart recorders to form a line image with a stylus to which electric current was applied. Printing of alphanumeric characters and simple graphic images evolved through the development of printheads capable of printing dot matrixes. More recent electrosensitive printing improvements have made possible the formation of complex graphic and facsimile images with electrosensitive papers.

The relative shiny or metallic appearance of early electrosensitive papers was considered a disadvantage by a number of users. This problem was resolved by several paper manufacturers by the expected technique of incorporating flatting agents in the dark layer underneath the metal layer to thereby reduce the glossiness of the finished paper, such as was commonly done to reduce gloss of other types of coatings. Some examples of this technique are also disclosed in the patent literature, see for example U.S. Pat. Nos. 3,786,518 and 3,861,952. Another proposed approach was to utilize a paper substrate having a rough surface texture, e.g. U.S. Pat. No. 3,758,336.

A typical modern use of electrosensitive papers is in conjunction with a multielectrode printhead controlled by a microprocessor as a printer associated with a computer terminal. The printhead consists of several electrodes tightly packed in close array; it is capable of printing in a dot matrix by microprocessor control of current to individual electrodes in the printhead. Printheads of this type are capable of high resolution image-formation, and the size of a printed mark can be adjusted by controlling the duration of the pulse of current or the applied voltage. However, additional burdens have been placed on electrosensitive papers because of the necessity to provide a paper that is capable of controlled image size in order to enable the formation of high resolution images. Another added requirement is the need to provide for printhead cleaning action so that the printhead will not become fouled by debris from the paper collecting within the interstices between individual wires of the printhead. Furthermore, electrosensitive papers need to have a high degree of thermal stability in order to permit the greater image density associated with some printheads of this type.

It has been found during the course of the research and development work resulting in the present invention that electrosensitive papers having surface roughness designed to reduce metallized gloss, such as described in the aforementioned patents, often interfere with the ability to completely remove the metal layer from the image areas, fail to precisely control image size and shape to the extent necessary for high resolution printing, and do not afford suitable cleaning action and/or thermal stability to prevent fouling of the printhead. One of the principal objects of this invention is to provide an electrosensitive recording paper that does not have the disadvantages of the prior papers.

Another principal object of this invention is to provide a new electrosensitive paper capable of high density, high resolution images. Yet another principal object is to provide an electrosensitive paper having controlled heterogeneous surface topology which is developed by providing a substrate having a very smooth surface and developing the desired surface topology through the structure of a colored coating on the substrate underneath the metallized layer. These and other objects will become apparent in the detailed description which is presented below.

DISCLOSURE OF THE INVENTION

In accordance with the concepts of the present invention, an electrosensitive recording paper includes (1) a substrate, which may comprise a paper layer, having a surface with defined smoothness and defined absorption characteristics, (2) an intermediate layer applied over said surface of the substrate that includes a binder and a combination of small-sized and large-sized solid particulates protruding from the binder to develop a heterogeneous topology for the imaging surface of the finished paper, and (3) a vacuum deposited metal layer over the intermediate layer. An image is formed when a part of the metal layer is vaporized to expose the underlying intermediate layer, which is colored to form a visible image.

BRIEF DESCRIPTION OF THE DRAWINGS

The present invention is described below in such full and concise detail as to enable its practice by those skilled in the art of producing metallized electrosensitive papers by reference to the following drawings, in which:

FIG. 1 is a schematic representation of one form of printing apparatus with which the electrosensitive papers of the present invention may be used;

FIG. 2 is a perspective view of a typical printhead of the apparatus;

FIG. 3 is an optical photomicrograph at 20× of a printhead such as that illustrated in FIG. 2;

FIG. 4 is a schematic end view, not to scale, of an electrosensitive paper of this invention;

FIG. 5 is a scanning electron microscope (SEM) photomicrograph at 1000× of an electrosensitive paper that is not made according to this invention which and can occur with an intermediate layer that does not have the binder characteristics defined.

Figure 6:
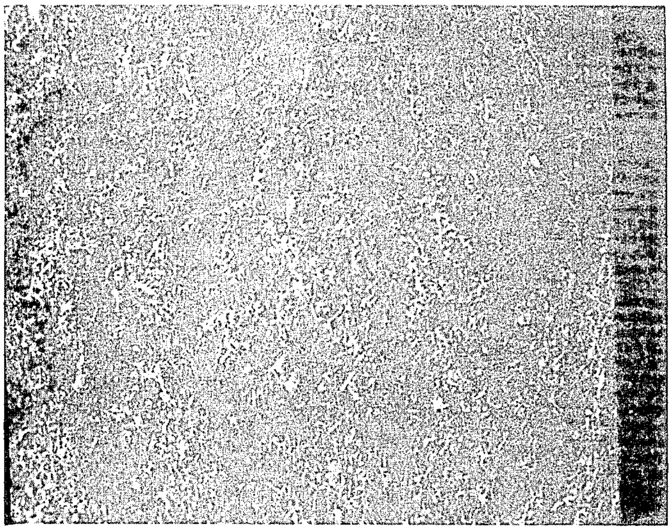

Small-sized solid particulates and large-sized solid particulates are combined in the intermediate layer 17 to precisely control surface roughness and abrasive wear. The small-sized particulate component is a solid material having a relatively uniform shape and a narrow particle size range of 0.1 micron to 2 microns average diameter. Suitable materials of this type include titanium dioxide having a size range of 0.2 to 0.7 microns, talc, silica compounds including diatomaceous silica, and calcium carbonate. Small-sized particles of this type are capable of effectively diffusing light to thereby provide a metallized paper having a relatively low glossiness, which is desired for most uses. However, it has been found that when these small-sized particulates were used by themselves in the intermediate layer, there was unacceptable abrasive wear and/or fouling of the printhead. For example, a test paper made solely with small-sized particulates of titanium dioxide in the intermediate layer caused rather quick fouling of a printhead designed for high resolution electrosensitive printing, and was unsatisfactory as an electrosensitive paper even though it had a low gloss value.

The large-sized solid particulate component of the intermediate layer 17 is to have a particle size range of 2 to 39 microns. Further, the large-sized particulate is to have a median particles size of 3 to 12 microns, within which range 3 to 9 microns is considered especially useful. Thus, the large-sized particulate is considerably larger and has a markedly wider range of particle size than the small-sized particulate. It was found during the development of the present papers that particles with a median size range under 3 microns prevented good electrosensitive printing by causing fouling of the printhead because of contamination of the printhead by failure to completely remove the metallized layer; further, when the median particle size was in excess of 12 microns, the larger size particles had an adverse impact on the quality of the printing by degrading the resolution of the printing by physically shielding sections of the metal layer. Suitable materials for the large-sized particulate include silica compounds such as diatomaceous silica, clay and calcium carbonate. Diatomaceous silica particles are especially useful; they have a unique internal structure which creates an extremely large surface area even though the particles are relatively large in size. Although large surface area increases the binder demand since more binder is necessary to effectively bond larger particles to the substrate, the irregularly shaped surface and internal structure of the diatomaceous silica particles provides an improved mechanical bond between the particles and the binder. The diatomaceous silica particles are of relatively low density (specific gravity about 2.3) and less abrasive than several of the materials useful for the small-sized particulates in the layer 17, and their larger size shields the printhead from contacting the more abrasive small particles.

With respect to the principal solid components of the intermediate layer, the coating formulation for the layer must contain sufficient binder to form a film capable of adhering the small-sized and large-sized particulates to the substrate but not so high an amount of binder as to completely fill in between the particles. The coating formulation is to contain sufficient quantities of small-sized particulates and large-sized particulates to develop a heterogeneous surface topology of agglomerates of the large-sized particulates with portions protruding above the binder film of the intermediate layer and small-sized particulates dispersed throughout the agglomerates and also having portions protruding above the binder film. The portions of the large-sized particulates protruding from the binder film extend beyond the portions of the small-sized particulates protruding from the binder film. Useful coatings are provided with formulations in which, expressed on a weight basis, the quantity of small-sized particulates in the formulation is in the range of about 35 to 70% of the binder content and the quantity of large-sized particulates in the formulation is in the range of about 25 to 65% of the binder content. The quantities of these ingredients in a specific coating formulation can vary within a wide range, as indicated in the general formulation set forth below, as long as these relative proportions are observed. In general, best results have been obtained with formulations in which there is a greater proportion of small-sized particulates than large-sized particulates, especially when the ratio of the parts by weight of the small-sized particulates to large-sized particulates is about 1.1 to 1.4.

The coating used to form the intermediate layer will normally include a minor amount of a dye or pigment to provide the color-contrast necessary to form a visible image when portions of the metal layer are removed during printing. Various other optional ingredients can be added to the coating in minor amounts to impart or adjust specific characteristics, such as a plasticizer for the organic binder, cross-linking resins such as a maleic resin to improve stability of the organic binder, or a compound to improve fade resistance. The vehicle for the coating can be either a solvent (or mixture of solvents) or water, depending upon the specific binder selected. The intermediate layer is to be non-conductive or only slightly conductive, and when materials such as carbon black are included that can make the layer electrically conductive, they preferably are used in small enough amounts to produce a layer that is electrically non-conductive. A general formulation for the coating is as follows, on a parts by weight basis:

| | |
|---|---|
| Binder | 10 to 65 parts |
| Small-sized particulates, 0.1 to under 2.0 micron particle size range | 3 to 25 parts |
| Large-sized particulates, 2 to 39 micron particle size range, 2 to 12 micron average particle size | 2 to 20 parts |
| Dye or pigment (with or without resin for dispersion) | 2 to 5 parts |
| Optional Ingredients | |
| Plasticizer | 0 to 5 parts |
| Cross-linking resin | 0 to 7 parts |
| Fade stabilizer | 0 to 5 parts |
| Vehicle, solvent or water | 20 to 60 parts |

Specific formulations are set forth in the Examples described below.

When the coating used to develop the intermediate layer 17 has been fully dried, as by evaporation of the solvent or water used as the vehicle for depositing the coating, the surface of the intermediate layer to which the metal layer 18 is applied is to have a repetitive pattern of agglomerated large-sized particulates with the small-sized particulates diffused between the agglomerates, the particulates being partially embedded in a film of the organic binder which bonds the particulates to the substrate. This heterogeneous surface topology pigmented coatings as used in the papermaking industry for adjusting the smoothness and ink penetration characteristics of paper to improve its printability. Either coating comprises a mixture of a pigment and a binder; many suitable formulations are employed, which are generally considered proprietary by each paper company, that use a pigment such as clay, calcium carbonate, titanium dioxide, talc, or a blend of two or more such pigments, in a binder such as styrene butadiene, polyvinyl acetate, acrylic latex, starch or a blend of two or more of such binders.

The surface 23 of the substrate 16 is to have a smoothness of 20 or less Sheffield units, as determined according to TAPPI Useful Method 518. The Sheffield smoothness test measures paper smoothness by the air leak method and is generally performed with an instrument supplied by the Bendix Corporation of Dayton, Ohio. The test procedure is described in detail in UM 518 published by TAPPI and is well-known in the paper industry.

A second preferred characteristic of the surface 23 of the substrate 16 is that it have an ink absorption measured as a brightness loss according to TAPPI Standard Test Method 542 os-58 to 10 to 40 units within which range a brightness loss of from 15 to 30 units is thought to be optimum. The brightness loss is measured on a K&N ink stain applied in accordance with TAPPI Useful Method 553, which estimates the resistance of a sheet of paper to the penetration of ink. The ink used for the test is a special printing ink consisting of inert pigment in a dyed varnish which is obtainable at K&N Laboratories, Country Side, Ill. and is a standard test widely used in the industry. It has been found during the development of the present invention that if the ink absorption characteristic of the surface 23 is within this range, the binder ingredient used for the intermediate layer 17 penetrates into the substrate sufficient to maintain adhesion of the particulates included in the layer 17 and also forms a film surface with portions of both the small-sized and large-sized particulates protruding therefrom.

As an optional feature, the substrate 16 may include a backside coating 24 on the surface of the substrate opposite from the surface 23. The coating 24 may be added to impart dimensional stability to the paper 15 so that it will resist curling, which can result when the paper absorbs moisture through an uncoated surface. The coating 24 may be any of the conventional pigmented coatings typically used in the paper industry for such purposes, and may contain the same pigments and binders described above in connection with the coatings 21 and 22.

The basis weight of the substrate 16 in pounds/ream, i.e. the weight in pounds of 500 sheets 24"×36", can vary over a wide range depending upon the characteristics desired for the finished paper such as with respect to stiffness and cost. Basis weights are typically in the range of 15 to 70 lbs. per ream, with a basis weight of about 35 lbs. per ream having been found suitable for most uses.

While paper is the preferred material for the substrate 16, commercially-available plastic films such as polyester, polypropylene and polyethylene films may also be employed if desired. Plastic films should be corona discharge treated to obtain adhesion of the intermediate layer 17. Plastic films are readily manufactured having the above Sheffield smoothness characteristic; plastic films do not absorb ink, so that the ink absorption characteristic is not necessary to define workable plastic film substrates.

(2) Intermediate Layer

The intermediate layer 17 is applied over the surface 23 of the substrate 16 to develop a particular surface topology of the electrosensitive paper 15. The layer 17 performs a number of functions:

(a) it creates a surface roughness of the paper 15 that is capable of effectively diffusing incident light when metallized;

(b) it provides sufficient cleaning action to remove printhead debris without causing excessive wear of the printhead;

(c) it provides a precise controlled reproducible surface topology that offers little resistance to removal of the metal layer 18 during image formation;

(d) it provides color contrast for imaging, as it is exposed when portions of the metal layer are vaporized during printing; and (e) it acts as a moisture barrier for reducing outgassing of moisture from the paper 20 during the metallizing process.

The intermediate layer 17 is applied onto the substrate 16 as a coating containing a binder and two different sizes of solid particulates as its principal ingredients.

The binder component of the intermediate layer 17 is an organic film-forming polymeric material that is thermally stable so as to be capable of withstanding the temperatures developed during electrostatic printing. The term "thermal stability" as used herein is defined as meaning that the binder does not decompose, soften or become tacky within a stated temperature range. A binder which is not thermally stable can develop debris or tackiness that will clog the printhead of a printing apparatus, as previously discussed. The binder also should be thermally stable during the vacuum metallizing process when the metal layer 18 is added to the structure.

For moderate thermal stress conditions during printing, the binder can be thermally stable over a temperature range up to about 125° C. Nitrocellulose is a suitable organic film-forming binder for papers intended for use with printers that can develop printing temperatures within this range.

However, for more rigorous applications such as encountered with high resolution electrostatic printheads, the binder should be thermally stable over a temperature range of 200° to 300° C. The compounds that have been found especially effective for the binder component of the layer 17 that are thermally stable from 200° to 300° C. include: cellulose acetate propionate, cellulose acetate, cellulose acetate butyrate, urethane resins, melamine resins, and acrylate resins. These specific materials are thermosetting polymeric resins and possess the requisite thermal stability plus other properties necessary for electrosensitive papers for use with high resolution printheads.

The effect of the lack of thermal stability of the binder component of an intermediate layer in an electrosensitive paper construction is evident from the scanning electron microscope photomicrograph of FIG. 5, which illustrates a metallized paper that has been imaged by an electrosensitive printer. It will be noted that the binder has decomposed and been removed from the substrate, the visual impression being that part of the binder has peeled away from the substrate. This condition leads to an unsatisfactory electrosensitive paper presents areas of controllable macro-roughness and micro-roughness to the printhead. The resulting heterogeneous surface effectively cleans printhead debris and offers less resistance to complete removal of the metal layer during imaging than a surface having a more even texture.

(3) Metal Layer

The metal layer 18 is to comprise a thin even layer of metal which is deposited over the intermediate layer 17 with conventional vacuum deposition equipment. The metal layer is uniform in thickness and resistivity in both the machine and cross-machine directions of the finished paper. Vacuum deposition, which is well-known, involves placing a web of the material to be metallized in a vacuum chamber, evacuating the chamber to the desired operating pressure by means of vacuum pumps, and evaporating a supply of metal within the chamber so as to coat the material. Aluminum is the metal most often used for the metal layer of electrosensitive papers, and vacuum within the chamber in the range of $5\times10^{-4}$ to $10^{-4}$ torr is generally employed. After removal from the vacuum chamber, the aluminum layer of an electrosensitive paper usually has a thin oxide layer at its interface with the intermediate layer 17 and another thin oxide layer at its outer surface, with pure aluminum sandwiched between these two oxide layers.

Uniform thickness and uniform resistivity of the metal layer 18 are important to providing uniform energy requirement for metal removal and imaging to the printer. Aluminum thickness deviations can dramatically affect image size and quality, and conductivity of the aluminum layer greatly influences the initiation phase of imaging or aluminum vaporization.

The substrate 16 is the thickest component of the electrosensitive paper 15 and will generally be about 0.00125 to 0.00375 inches thick; 0.0025 inches thick is appropriate for most end uses. The intermediate layer 17 can be applied at a coating weight of about 1 to 5 pounds per ream, and can be, for example, about 0.00025 inches thick. The metal layer 18 is very thin and may be about 150 to 400 Angstroms units thick, with about 300 Angstrom units being typical; the metal layer should generally have a surface resistivity of about 1.6 to 2.8 ohms/square.

Specific electrosensitive papers of this invention are described in detail in the following Examples. The term "parts" as used in this description and the claims means parts by weight.

EXAMPLE 1

A coating was formulated with the composition:

| | Parts |
|---|---|
| Binder | |
| Cellulose acetate propionate | 14.2 |
| Large-sized Particulates | |
| Diatomaceous silica with a particle size range of 2 to 39 microns, and a median particle size of 5.5 microns | 7.4 |
| Small-sized Particulates | |
| Titanium dioxide with a particle size range of 0.2 to 0.7 microns | 9.3 |
| Dye or Pigment | |
| Basic black 1470, consisting of 2.5 parts black pigment dispersed in 2.5 parts phenolic resin and 5.0 parts ethyl alcohol | 10.0 |

-continued

| | Parts |
|---|---|
| Other Ingredients | |
| (1) Plasticizer, dioctyl phthalate (DOP) | 3.9 |
| (2) Cross-linking resin, 3.0 parts of maleic resin in 4.5 parts ethyl alcohol | 7.5 |
| Vehicle | |
| Ethyl Alcohol | 41.9 |
| Ethyl Acetate | 5.8 |

Figure 7:
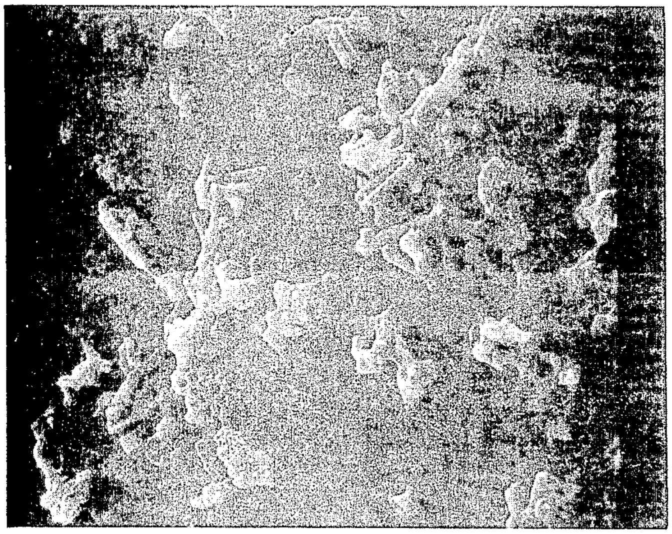

The above coating was applied to a surface of a coated calendered paper (35 lb. basis weight) web having a Sheffield smoothness of about 10 and an ink absorbency measured as a brightness loss of 25 units. The coating was applied to the paper substrate with a flexographic coater at a coating weight of about 2.0 lbs. per ream; when dried, the coating formed a black intermediate layer having the small-sized particulates dispersed within agglomerates of the large-sized particulates. The SEM photomicrograph of FIG. 6 illustrates the paper at this stage under 100× and the SEM photomicrograph of FIG. 7 illustrates it under 1000×; the arrangement of the small-sized and large-sized particulates is readily observed in the photomicrographs, and also the manner in which they protrude from the organic binder film layer. Excellent control of the nature of the intermediate layer was obtained and the film splitting action of the metering nips of the coater effectively segregated the particle sizes and shapes in a unique repetitive heterogeneous surface pattern. After drying, a thin even layer of aluminum was applied over the intermediate layer by vacuum deposition. The metal layer was about 300 Angstrom units thick and had a surface resistivity of about 2.2 ohms/ square.

Electrosensitive papers were made with intermediate layers of the formulations of Examples 2 and 3 applied to the same paper substrate as that of Example 1 using the same coating technique. The papers had the same heterogeneous surface topology developed by the small-sized particulates dispersed within agglomerates of the large-sized particulates as the paper of Example 1.

| | Parts |
|---|---|
| Binder | |
| Cellulose acetate propionate | 14.9 |
| Large-sized Particulates | |
| Diatomaceous silica with a particle size range of 2 to 39 microns, and a median particle size of 5.5 microns | 5.5 |
| Small-sized Particulates | |
| Titanium dioxide with a particle size range of 0.2 to 0.7 microns | 7.0 |
| Dye or Pigment | |
| Basic black 1470, consisting of 2.7 parts black pigment dispersed in 2.7 parts phenolic resin and 5.3 parts ethyl alcohol | 10.7 |
| Other Ingredients | |
| (1) Plasticizer, dioctyl phthalate (DOP) | 4.1 |
| (2) Cross-linking resin, 3.0 parts of maleic resin in 4.5 parts ethyl alcohol | 7.9 |
| Vehicle | |
| Ethyl Alcohol | 43.8 |
| Ethyl Acetate | 6.1 |

EXAMPLE 3

| | Parts |
|---|---|
| Binder | |
| Nitrocellulose | 14.5 |
| Large-sized Particulates | |
| Diatomaceous silica with a particle size range of 2 to 39 microns, and a median particle size of 5.5 microns | 6.6 |
| Small-sized Particulates | |
| Titanium dioxide with a particle size range of 0.2 to 0.7 microns | 8.5 |
| Dye or Pigment | |
| Basic black 1470, consisting of 2.6 parts black pigment dispersed in 2.6 parts phenolic resin and 5.1 parts ethyl alcohol | 10.3 |
| Other Ingredients | |
| (1) Plasticizer, dioctyl phthalate (DOP) | 4.0 |
| (2) Cross-linking resin, 3.0 parts of maleic resin in 4.5 parts ethyl alcohol | 7.7 |
| Vehicle | |
| Ethyl Alcohol | 42.5 |
| Ethyl Acetate | 5.9 |

The electrosensitive papers of Examples 1–3 each had a thin even layer of aluminum vacuum-deposited over the intermediate layer, so that the imaging surface of the metal layer took on the heterogeneous topology developed by the combination of small-sized and large-sized particulates in the intermediate layer. The architecture of the imaging surface of the papers has been described above as having the small-sized particulates dispersed within agglomerates of the large-sized particulates. FIGS. 6 and 7 illustrate the paper of Example 1 after the intermediate layer has been dried but before the metal has been vacuum-deposited over it. When the thin even (i.e., uniform thickness) metal layer is applied over an intermediate layer of this type, the imaging surface of the metal layer conforms to or assumes the heterogeneous topology of the intermediate layer. Both the large-sized particulates and the small-sized particulates protrude from the organic binder material, which forms a film for adhering the particulates to the substrate while not filling in the particulates completely so that both the small and large-sized particulates have portions projecting above the film formed by the binder of the intermediate layer.

The binders used in the papers of Examples 1 and 2 were thermally stable over a temperature range of 200° to 300° C. and the binder in the paper of Example 3 was thermally stable over a temperature range up to about 125° C. When measured according to the procedure of ASTM D523 at 60° with a Hunter glossmeter, papers according to Example 1 had 60° gloss readings in the range of 30 to 45 gloss units, papers of Example 2 had 60° readings in the range of 63 to 67 units, and papers of Example 3 had 60° readings in the range of 33 to 38 gloss units. Papers of Example 1 were tested for abrasive wear on a drum tester according to ASTM G56-77, Standard Test Method for Abrasiveness of Ink-impregnated Fabric Printer Ribbon and were found to have a very low abrasive wear coefficient, thereby indicating that the papers would not cause undue wear of a printhead; the papers of Examples 2 and 3 would have similar low abrasive wear coefficients.

The electrosensitive papers of Examples 1 and 2 were tested for printability with a printer designed for use with a computer that included a printhead having a tightly packed array of fine electrodes. Both papers provided high resolution images of excellent quality; for example, when tested for printing of alphabetical characters of 13 pitch, 6 lines per inch, visual examination disclosed the printed characters were all very legible and none had portions missing such as to cause illegibility. During extended printing tests, it was also noted that the papers provided effective cleaning of the printhead by preventing the accumulation of debris that would cause clogging of the printhead, or wear of moving mechanical parts. The papers provided efficient cleansing action without causing unacceptable wear of the printhead. The paper of Example 3 produced similar results when tested with an electrostatic printer that imposed less severe requirements on the paper.

The electrosensitive recording papers of this invention exhibit three important characteristics as a result of their unique heterogeneous surface topology. First, as discussed above, the uneven texture of the imaging surface mechanically removes debris from the electrodes of a printhead and also inhibits printhead fouling by presenting depressions not reached by printhead electrodes in which debris can accumulate instead of building up on machine elements. Secondly, the uneven surface texture can diffuse incident light and reduce specular gloss to provide highly legible printed images. Thirdly, the heterogenity of the imaging surface developed by the combination of small-sized and large-sized particulates in the intermediate layer offers an optimum electrical contact surface to a printhead. Controlling the surface topology provides control of the electrical resistance at the paper-to-printhead interface. Using all small-sized particulates results in an evenly-textured imaging surface of low electrical resistance which prolongs the initiation phase of electrostatic printing. Using all large-sized particulates shields areas of the paper which prevents complete metal removal from areas intended to be imaged.

Industrial Applicability

The electrosensitive recording papers described above are capable of providing high quality printed images of high resolution with printing apparatus including a printhead with a tightly packed array of fine electrodes capable of printing in dot matrix patterns. High speed printing under such conditions is also possible with the electrosensitive papers of this invention. While providing high quality printing, the present electrosensitive papers produce effective cleaning of a printhead so as to reduce clogging of the electrodes of the printhead, and also reduce the accumulation of debris developed during imaging on exposed mechanical elements of the printing apparatus. Although particularly adapted for printing apparatus that impose high requirements on electrosensitive paper, the present papers may also be employed with electrosensitive printing apparatus having less rigid paper requirements.

The foregoing and other useful attributes are a result of the unique structure of the present papers which includes a substrate having a specified smoothness characteristic on at least one surface, an intermediate layer applied over said surface that includes an organic binder of specified thermal stability characteristics and a combination of large-sized solid particulates and small-sized solid particulates that extend from the film formed by the binder so as to produce a heterogeneous surface topology having the small-sized particulates dispersed within agglomerates of the large-sized particulates, and a thin even layer of metal such as aluminum vacuum-deposited over the intermediate layer so as to assume its surface topology and thereby form an imaging surface having optimum electrical contact with a printhead. Thus, the physical configuration of the imaging surface of the metal layer is developed by means of the intermediate layer of the construction, and the roughness and coating receptivity of the surface of the substrate carrying the intermediate layer affects the surface morphology of the intermediate layer. The synergistic interaction between the substrate surface and the intermediate layer thus determines the final surface morphology of the imaging surface of the metal layer.

The binder and other components of the intermediate layer are thermally stable at a temperature range of 200° to 300° C. so as to be capable of withstanding temperatures associated with high volume, high density electrostatic printing, and thermally stable at a temperature range up to about 125° C. when intended for use with printers that operate at lower density electrostatic printing conditions. The small-sized and large-sized particulates of the intermediate layer both function to reduce the glossiness of the metal layer, and the papers can have gloss readings in the range of 5 to 60 gloss units. Furthermore, the combination of the two particulates produces reduced fouling of the printhead; this latter function is principally supplied by the large-sized particulates which operate to brush off small-sized particulates and other debris which may accumulate on the printhead. The solid particulates in the intermediate layer also reduce the contact between the printhead and the organic binder of the intermediate layer, so as to thereby further reduce thermal decomposition of the binder compound, which is the least heat resistant component of the intermediate layer.

I claim:

1. In electrosensitive recording materials of the type including (a) a substrate web, (b) an intermediate colored layer on a surface of the substrate web, and (c) a vacuum-deposited metal layer over the intermediate layer, which recording materials develop an image when portions of the metal layer are vaporized when subjected to electric current from a printhead in contact therewith to thereby expose portions of the colored intermediate layer, the improvement wherein:

(1) the substrate is a web of paper of plastic film with a first surface having a smoothness of 20 or less Sheffield units and an ink absorption characteristic providing a brightness loss of 10 to 40 units;

(2) the intermediate layer is on the first surface of the substrate web and includes (a) a thermally stable organic film-forming binder, (b) small-sized solid parrticulates having a particle size range of 0.1 to 2.0 microns average diameter, and (c) large-sized solid particulates having a particle size range of 2 to 39 microns with a median particle size of 3 to 12 microns, the binder forming a film adhering the small-sized and large-sized particulates to the first surface of the substrate, the particulates being partially embedded in the film with the large-sized particulates having portions protruding from the film and extending beyond portions of the small-sized particulates protruding from the film, the intermediate layer thereby having a heterogeneous surface topology formed by the small-sized particulates dispersed within agglomerates of the large-sized particulates; and (3) the vacuum-deposited metal layer is a thin even layer of metal extending over and conforming to the heterogeneous surface topology of the intermediate layer.

2. Electrosensitive recording material according to claim 1 in which:

the small-sized solid particulates are titanium dioxide, talc, silica or calcium carbonate particles; and the large-sized solid particulates are diatomaceous silica, clay or calcium carbonate particles.

3. Electrosensitive recording material according to claim 1 in which:

the binder is cellulose acetate proionate, cellulose acetate, cellulose acetate butyrate, a urethane resin, a melamine resin or an acrylate resin and is thermally stable in the temperature range of 200° to 300° C.

4. Electrosensitive recording material according to claim 1 in which:

the binder is nitrocellulose and is thermally stable in the temperature range up to about 125° C.

5. Electrosensitive recording material according to claim 1 in which:

the vacuum-deposited metal layer is aluminum and about 150 to 400 Angstrom units thick.

6. Electrosensitive recording material according to claim 1, 2, 3, 4 or 5 in which:

the quantity of small-sized solid particulates in the intermediate layer is about 35 to 70% of the binder content thereof and the quantity of large-sized solid particulates in the intermediate layer is about 25 to 65% of the binder content thereof, all on a weight basis.

* * * * *

UNITED STATES PATENT AND TRADEMARK OFFICE

CERTIFICATE OF CORRECTION

PATENT NO. : 4,438,170

DATED : June 21, 1982

INVENTOR(S) : John P. McCue

It is certified that error appears in the above—identified patent and that said Letters Patent is hereby corrected as shown below:

Col. 2, lines 17 and 18, "and-/or" should be --and/or--.

Col. 5, line 24, "to", first occurrence, should be --of--.

Col. 8, line 48, in left hand column of table, "2 to 12 microns" should be --3 to 12 microns--.

Col. 9, line 43, "Angstroms" should be --Angstrom--.

Col. 10, line 45, insert --EXAMPLE 2--.

Col. 13, line 49 (claim 1), "of" should be --or--.

Col. 14, line 4, (claim 1), "parrticulates" should be --particulates--.

Col. 14, line 32, (claim 3), "proionate" should be --propionate--

Signed and Sealed this

*Nineteenth* Day of *June 1984*

[SEAL]

*Attest:*

GERALD J. MOSSINGHOFF

*Attesting Officer* *Commissioner of Patents and Trademarks*